US010189556B2

(12) United States Patent
Minchau et al.

(10) Patent No.: US 10,189,556 B2
(45) Date of Patent: Jan. 29, 2019

(54) CONNECTION ASSEMBLY FOR AIRCRAFT DOOR

(71) Applicant: BOMBARDIER INC., Dorval (CA)

(72) Inventors: Ken Minchau, St-Lazare (CA); Michel Tourangeau, Montreal (CA); Keith Wood, Beaconsfield (CA); Eric Lee, Montreal (CA); Gildas Martin, Montreal (CA); Damien Buchet, Toulouse (FR); John Savidge, Senneville (CA); Denis Chabot, Montberon (FR)

(73) Assignee: BOMBARDIER INC., Dorval, Québec (CA)

( * ) Notice: Subject to any disclaimer, the term of this patent is extended or adjusted under 35 U.S.C. 154(b) by 125 days.

(21) Appl. No.: 15/461,973

(22) Filed: Mar. 17, 2017

(65) Prior Publication Data

US 2017/0183079 A1 Jun. 29, 2017

Related U.S. Application Data

(63) Continuation of application No. 14/380,653, filed as application No. PCT/IB2012/000375 on Feb. 29, 2012, now abandoned.

(51) Int. Cl.
*B64C 1/14* (2006.01)
(52) U.S. Cl.
CPC ............ *B64C 1/1461* (2013.01); *B64C 1/143* (2013.01); *B64C 1/1423* (2013.01)
(58) Field of Classification Search
CPC ...... B64C 1/1423; B64C 1/143; B64C 1/1461
See application file for complete search history.

(56) References Cited

U.S. PATENT DOCUMENTS

| 2,997,751 A | 8/1961 | McPherren |
| 3,791,073 A | 2/1974 | Baker |

(Continued)

FOREIGN PATENT DOCUMENTS

| CN | 1212937 A | 4/1999 |
| DE | 102004036184 A1 | 2/2006 |

(Continued)

OTHER PUBLICATIONS

International Search Report and Written Opinion dated Nov. 26, 2012, for International Patent Application No. PCT/IB2012/000375.

(Continued)

*Primary Examiner* — Richard R. Green
(74) *Attorney, Agent, or Firm* — Karceski IP Law, PLLC

(57) ABSTRACT

A system for opening a door of an aircraft includes a connection assembly adapted to connect the door to a fuselage section of the aircraft. The connection assembly includes a main hinge pivotally connected to the fuselage section and a link assembly connecting the door to the main hinge and pivotally connected to the fuselage section, the link assembly including one member slidingly and pivotally connected to the door. The system also includes a latch mechanism between the door and the main hinge, the latch mechanism being adapted to be actuated. The system is adapted to move the door upwardly and inwardly along a predetermined path without moving the main hinge through movement of the latch mechanism and, subsequently, to pivot the door around a virtual pivot point located outside of the aircraft by moving the main hinge once the door has reached an end of the predetermined path.

14 Claims, 7 Drawing Sheets

(56) References Cited

U.S. PATENT DOCUMENTS

| | | | |
|---|---|---|---|
| 4,125,235 A | 11/1978 | Fitzgerald et al. | |
| 4,199,120 A | 4/1980 | Bergman et al. | |
| 4,470,566 A | 9/1984 | Fitzgerald | |
| 4,497,462 A | 2/1985 | Hamatani | |
| 4,720,065 A | 1/1988 | Hamatani | |
| 4,915,326 A | 4/1990 | Plude | |
| 5,031,863 A | 7/1991 | Noble | |
| 5,064,147 A | 11/1991 | Noble | |
| 5,316,241 A | 5/1994 | Kallies et al. | |
| 5,636,814 A | 6/1997 | Rollert | |
| 5,704,569 A | 1/1998 | Daniels | |
| 5,931,415 A | 8/1999 | Lingard et al. | |
| 6,168,114 B1 * | 1/2001 | Erben | B64C 1/143 244/129.5 |
| 7,357,354 B2 | 4/2008 | Mortland | |
| 7,654,488 B2 | 2/2010 | Obst | |
| 7,883,058 B2 * | 2/2011 | Erben | B64C 1/1423 244/129.5 |
| 2006/0202087 A1 | 9/2006 | Mortland | |

FOREIGN PATENT DOCUMENTS

| | | |
|---|---|---|
| EP | 0876954 A2 | 11/1998 |
| WO | 2006010437 A1 | 2/2006 |

OTHER PUBLICATIONS

"Overwing exits," printed Mar. 3, 2011, from Wikipedia: http://en.wikipedia.org/wiki/Overwing_exits.
Page 119 from "Machine Design" magazine, dated Jul. 6, 1961.
Chinese Office Action dated May 29, 2015, for Chinese Patent Application No. 201280070993.9.
Chinese Office Action dated Mar. 15, 2016, for Chinese Patent Application No. 201280070993.9.
Chinese Office Action dated Sep. 9, 2016, for Chinese Patent Application No. 201280070993.9.

* cited by examiner

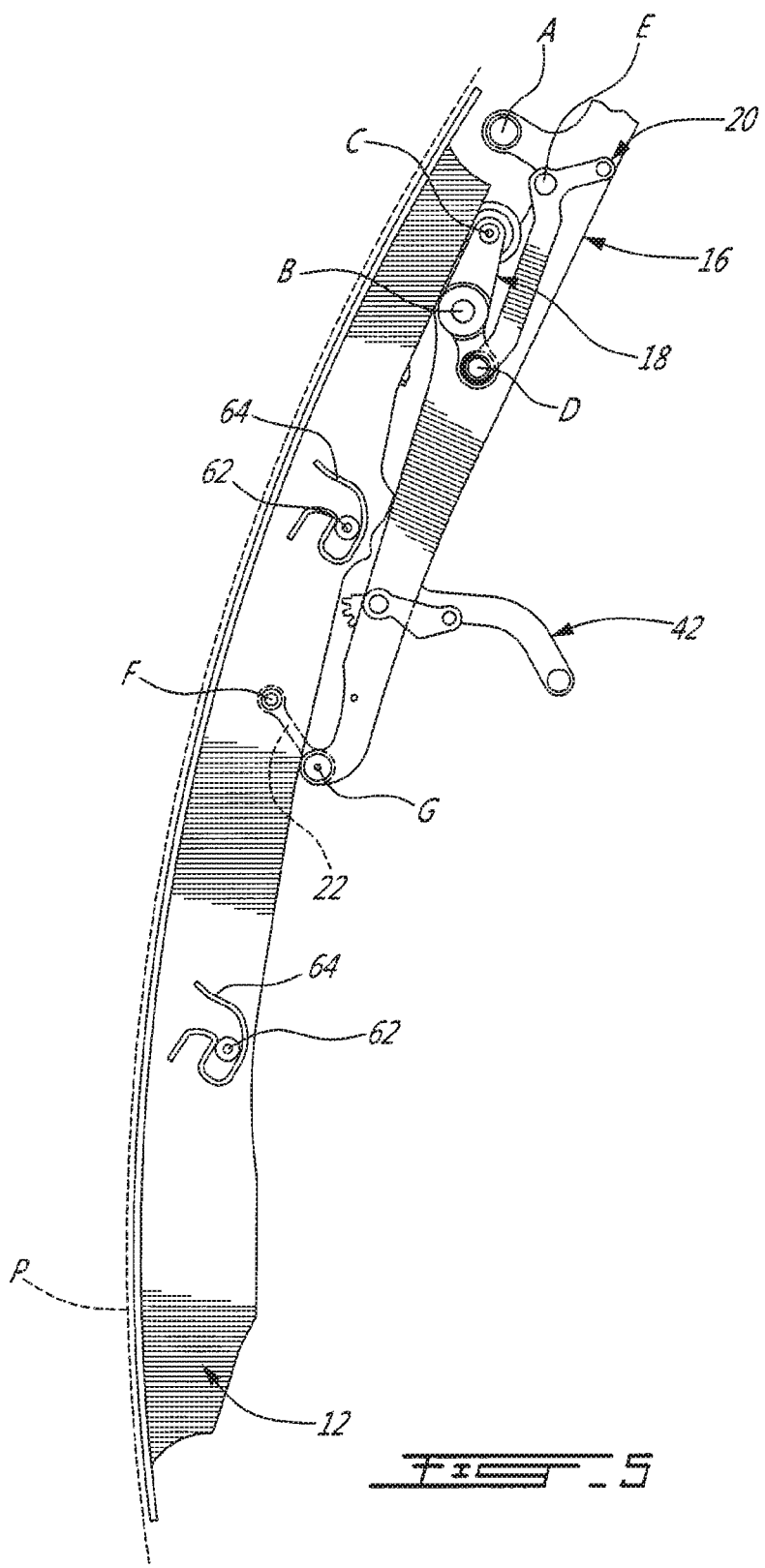

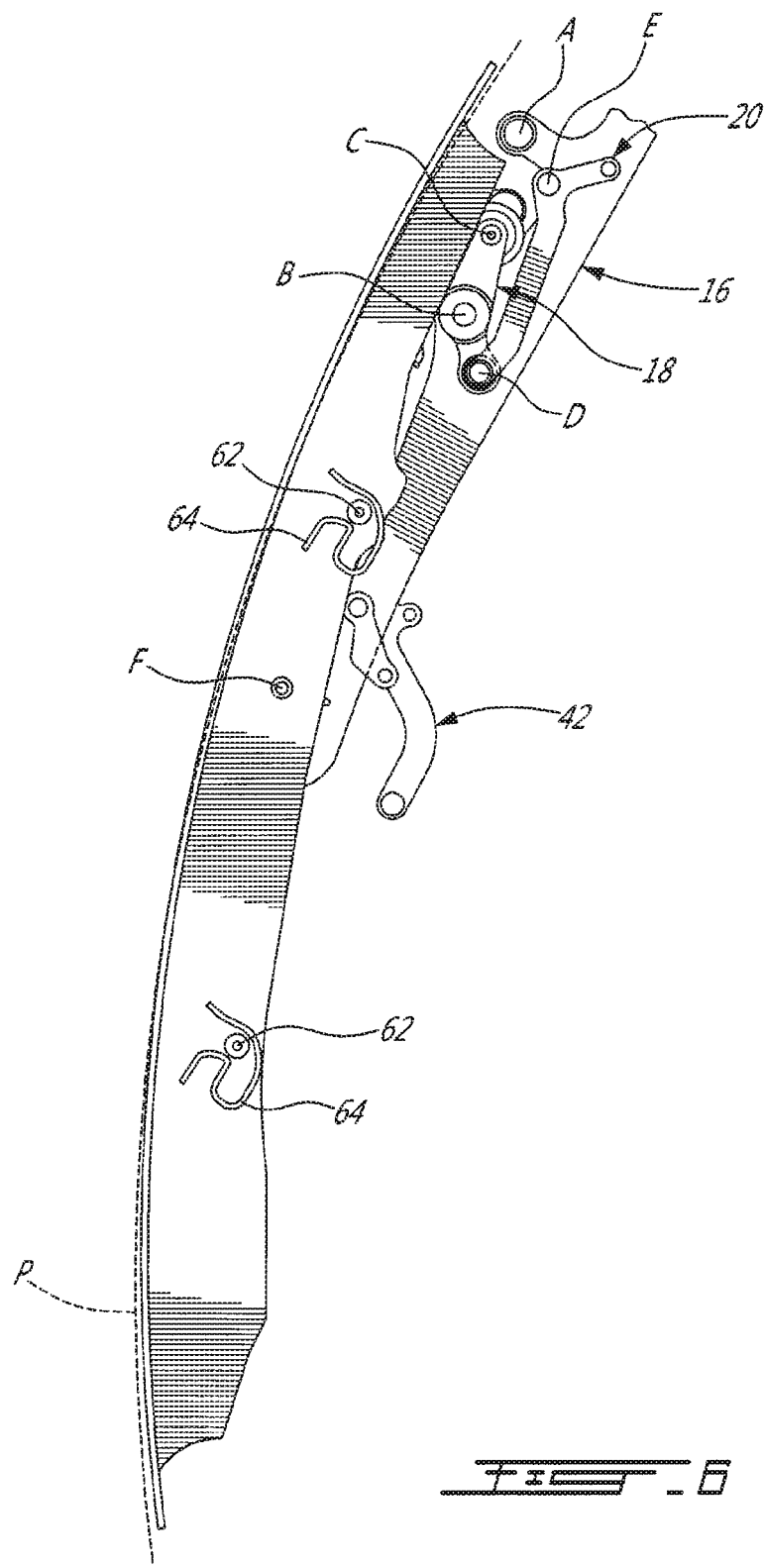

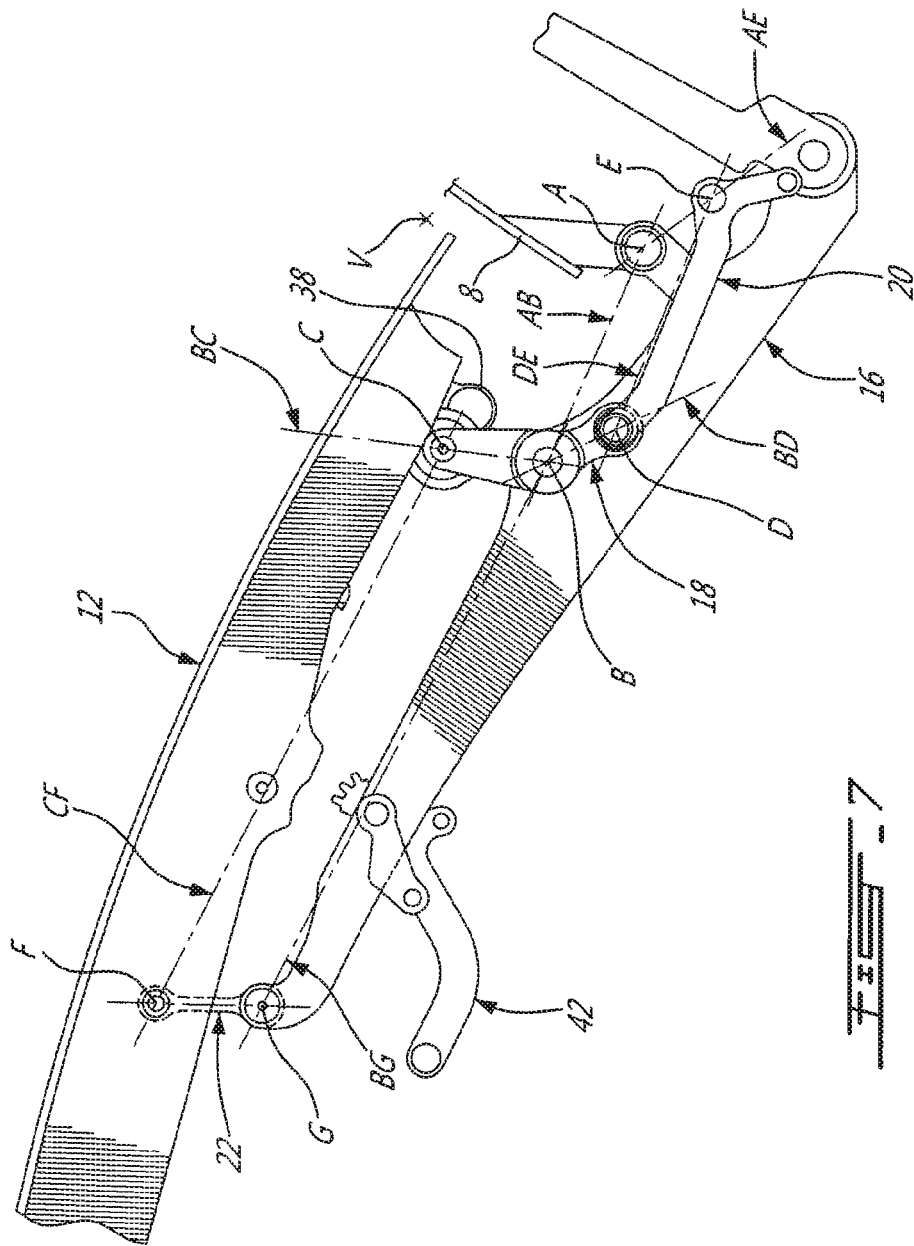

CONNECTION ASSEMBLY FOR AIRCRAFT DOOR

CROSS-REFERENCE TO RELATED APPLICATIONS

This is a continuation of U.S. patent application Ser. No. 14/380,653, filed on Aug. 22, 2014, which is a National Stage Entry into the United States Patent and Trademark Office from International Patent Application No. PCT/IB2012/000375, having an international filing date of Feb. 29, 2012, the entire contents of both of which are incorporated herein by reference.

FIELD OF THE INVENTION

The present application relates to a connection assembly for an aircraft door, more particularly for an emergency exit door located over the aircraft wing.

BACKGROUND OF THE ART

Emergency exits such as overwing exits are provided on aircraft to supplement the evacuation capacity of the main doors. These exits are usually passenger-actuated and as such must be simple to operate. On the other hand, precautions are necessary to avoid unintentional opening as well as intentional opening when the aircraft is at high altitude.

Emergency doors such as shown in U.S. Pat. Nos. 5,931,415 and 5,031,863 are attached to the fuselage through a gooseneck hinge member pivotally attached to the fuselage on top of the door. The gooseneck portion of the hinge members forms an inward protrusion when the door is in the closed position and which may be contained within the thickness of the wall. However, a certain wall thickness is required to accommodate the hinge members and in particular the gooseneck portion of the hinge members. Including such a construction in an aircraft having a smaller wall thickness than the one depicted in U.S. Pat. Nos. 5,931,415 and 5,031,863 may require a protrusion extending toward the cabin of the aircraft to be formed in the inner wall to accommodate the gooseneck portion of the hinge members.

Therefore, there is a need for an improved connection assembly for an aircraft door that addresses at least some of the deficiencies of the prior art.

SUMMARY OF THE APPLICATION

It is, therefore an aim of the present disclosure to provide an improved connection assembly for an aircraft door. In a particular embodiment the present connection assembly allows for containment within a more compact space than a corresponding gooseneck hinge arrangement.

Therefore, in accordance with the present invention, a system for opening a door of an aircraft is provided. The system includes a connection assembly adapted to connect the door to a fuselage section of the aircraft. The connection assembly includes a main hinge pivotally connected to the fuselage section and a link assembly connecting the door to the main hinge and pivotally connected to the fuselage section, the link assembly including one member slidingly and pivotally connected to the door. The system also includes a latch mechanism between the door and the main hinge, the latch mechanism being adapted to be actuated. The system is adapted to move the door upwardly and inwardly along a predetermined path without moving the main hinge through movement of the latch mechanism and, subsequently, to pivot the door around a virtual pivot point located outside of the aircraft by moving the main hinge once the door has reached an end of the predetermined path.

In one contemplated embodiment, the connection assembly includes a pair of first links each having a first connection point pivotally attached to the fuselage section at a respective fuselage location, a second connection point spaced apart from the first connection point and a first link axis extending between the first and second connection points thereof, the first link axes being non-parallel to one another, the fuselage locations being spaced apart and defining a first reference axis extending therebetween. The connection assembly also includes a pair of second links each having a first connection point pivotally attached to the door at a respective door location, a second connection point spaced apart from the first connection point and a second link axis extending between the first and second connection points thereof, the second link axes being non-parallel to one another, the door locations being spaced apart and defining a second reference axis extending therebetween. Still further, one of the first links interconnecting the second connection points of the second links with a first connection axis is defined through the second connection points of the second links and has a different orientation than the first link axis of the one of the first links. In addition, one of the second links interconnecting the second connections points of the first links with a second connection axis is defined through the second connection points of the first link and has a different orientation than the second link axis of the one of the second links.

It is contemplated that the pair of first links and the pair of second links are provided adjacent each one of two sides of the door.

In one variation, the first connection axis is non-parallel to the second reference axis when the door is in the closed position.

Still further, the present invention provides a system for opening a door of an aircraft where the first connection axis is approximately parallel or parallel to the second reference axis when the door is in the opened position.

According to another embodiment of the present invention, the second connection axis is non-parallel to the first reference axis.

In a further embodiment, with the door in the closed position, the first link axes extend at about 7° from one another and the second link axes extend at about 62° from one another.

It is also contemplated that, with the door in the closed position, the first link axes extend from 6.7° to 7.4° from one another and the second link axes extend from 59° to 65° from one another.

Alternatively, with the door in the closed position, the first link axes may extend from 5.6° to 8.4° from one another and the second link axes may extend from 50° to 74° from one another.

In one configuration, with the door in the closed position, the first connection axis and the second reference axis may extend at about 8° from one another, and the second connection axis and the first reference axis may extend at about 23° from one another.

Also, with the door in the closed position, the first connection axis and the second reference axis may extend from 7.6° to 8.4° from one another, and the second connection axis and the first reference axis may extend from 22° to 24° from one another.

In yet another embodiment, with the door in the closed position, the first connection axis and the second reference axis may extend from 6.4° to 9.6° from one another, and the second connection axis and the first reference axis may extend from 18° to 28° from one another.

It is contemplated that the one of the links of the second pair connected to the links of the first pair has the first connection thereof also slidingly connected to the door.

The present invention also provides for a method of opening a door of an aircraft, the door being connected to a fuselage section of the aircraft through a connection assembly including a main hinge pivotally connected to the fuselage section and a link assembly connecting the door to the main hinge and pivotally connected to the fuselage section, the link assembly including one member slidingly and pivotally connected to the door. The method is contemplated to include actuating a latch mechanism between the door and the main hinge, moving the door upwardly and inwardly along a predetermined path without moving the main hinge through the movement of the latch mechanism, and once the door has reached an end of the predetermined path, pivoting the door around a virtual pivot point located outside of the aircraft by moving the main hinge.

Other aspects of the present invention will be made apparent from the discussion that follows.

BRIEF DESCRIPTION OF DRAWINGS

For a better understanding of the present invention, as well as other aspects and further features thereof, reference is made to the following description which is to be used in conjunction with the accompanying drawings, where:

FIG. 5 is a schematic side view of the door of FIG. 2, in a partially lifted position;

FIG. 6 is a schematic side view of the door of FIG. 2, in a completely lifted position; and FIG. 7 is a schematic side view of part of the door of FIG. 2, in a completely opened position.

DESCRIPTION OF PARTICULAR EMBODIMENTS

Figure 1:
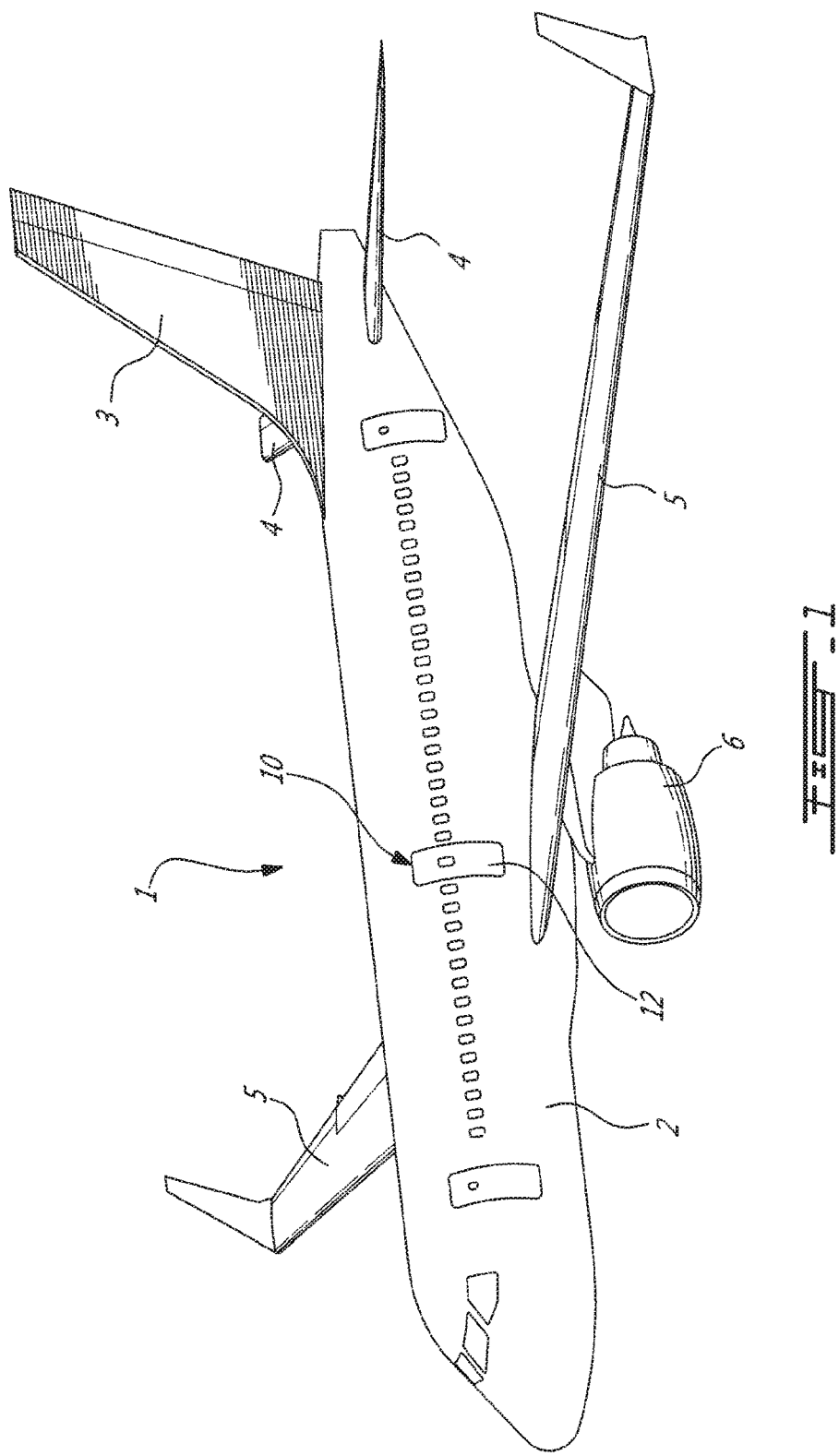
FIG. 1 is a schematic tridimensional view of an aircraft having an emergency overwing exit.

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft.

The aircraft 1 includes an emergency exit 10, which in the embodiment shown is an overwing exit for emergency passenger evacuation onto the wing. Alternately, the emergency exit 10 could be positioned elsewhere on the fuselage.

The exit 10 includes a door 12 that is hinged on the fuselage 2 to have an initial inward opening movement as defined by the current FAR regulations; positive pressurisation of the fuselage acting on the mean pressure plane of the fully closed door ensures a positive door closure force.

Figure 2:
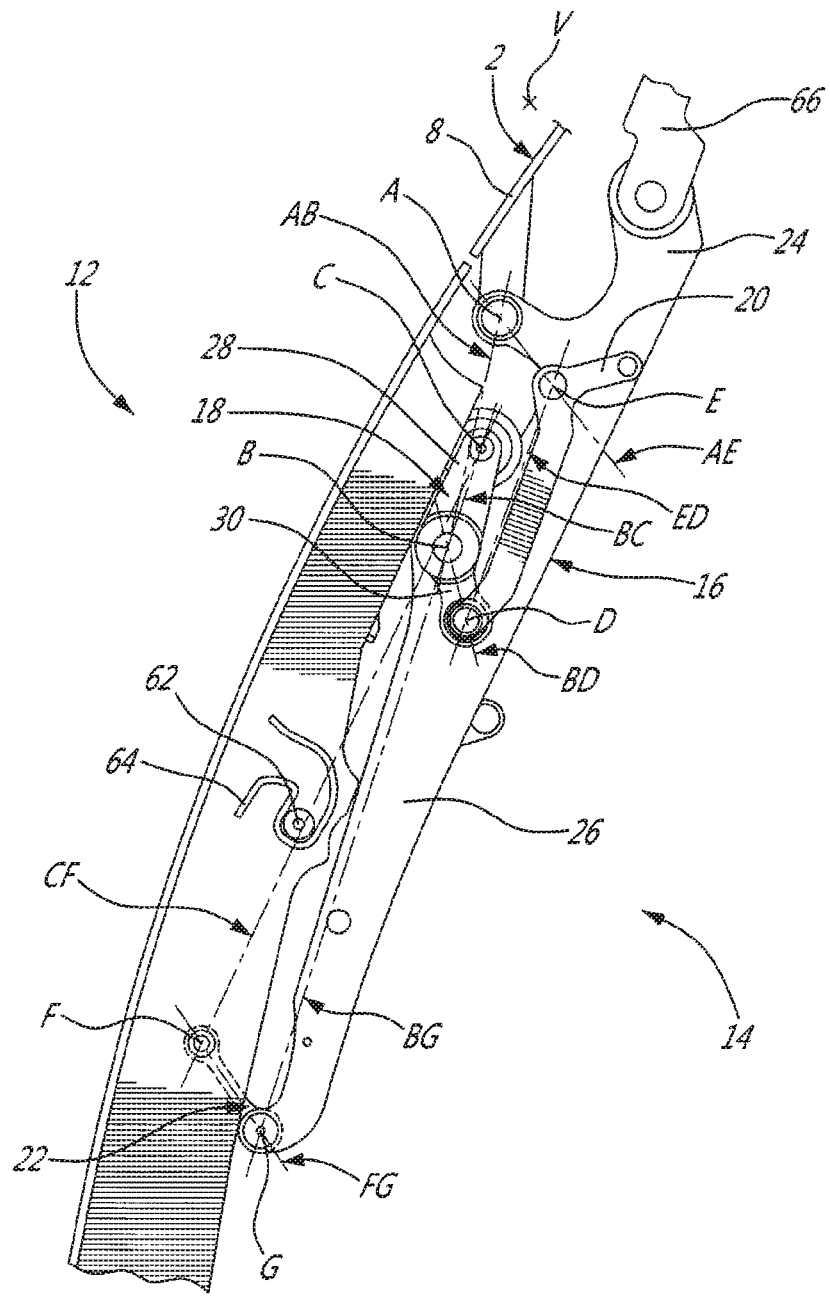
FIG. 2 is a schematic side view of part of an emergency exit door in accordance with a particular embodiment, which can be used in an aircraft such as shown in FIG. 1, the door being in a closed position.
Figure 3:
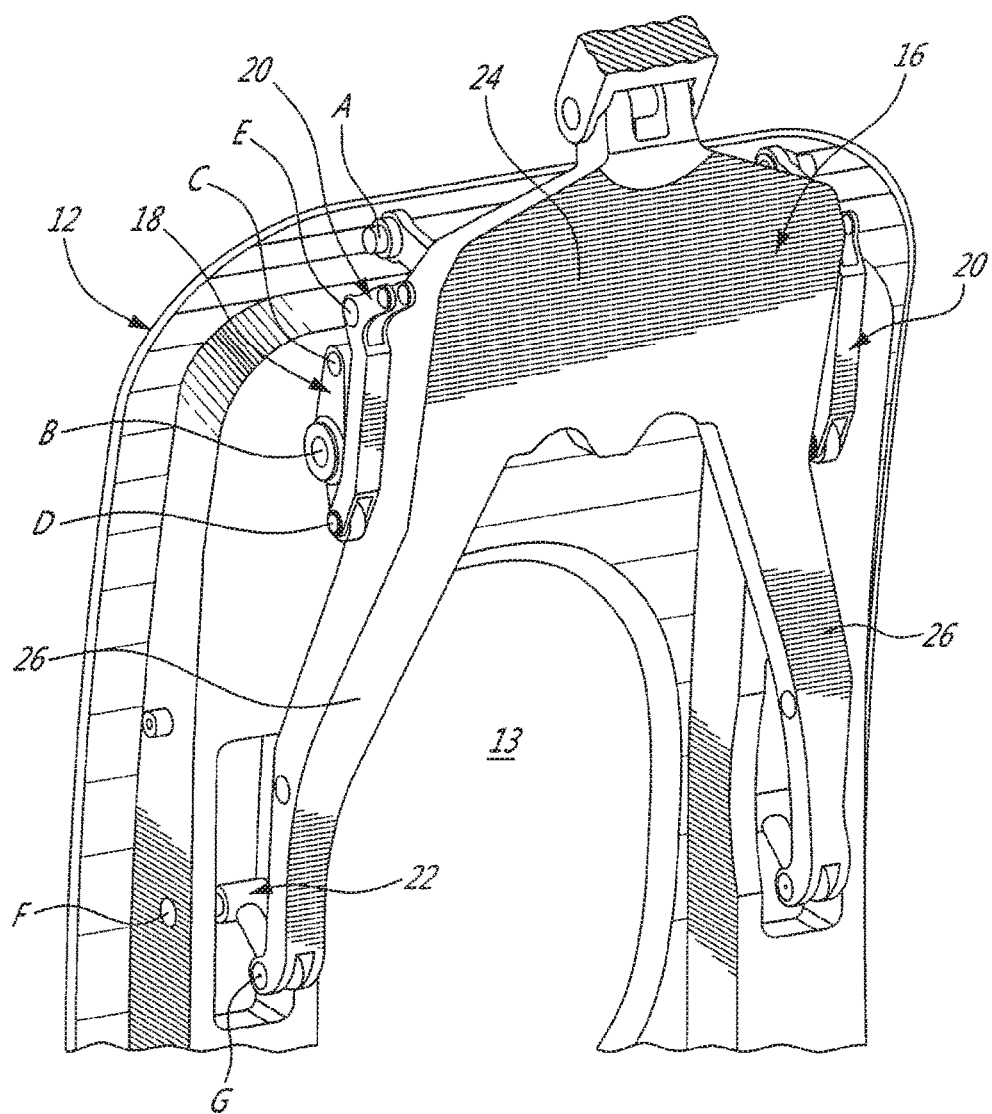
FIG. 3 is a schematic tridimensional view of part of the door of FIG. 2.
Figure 4:
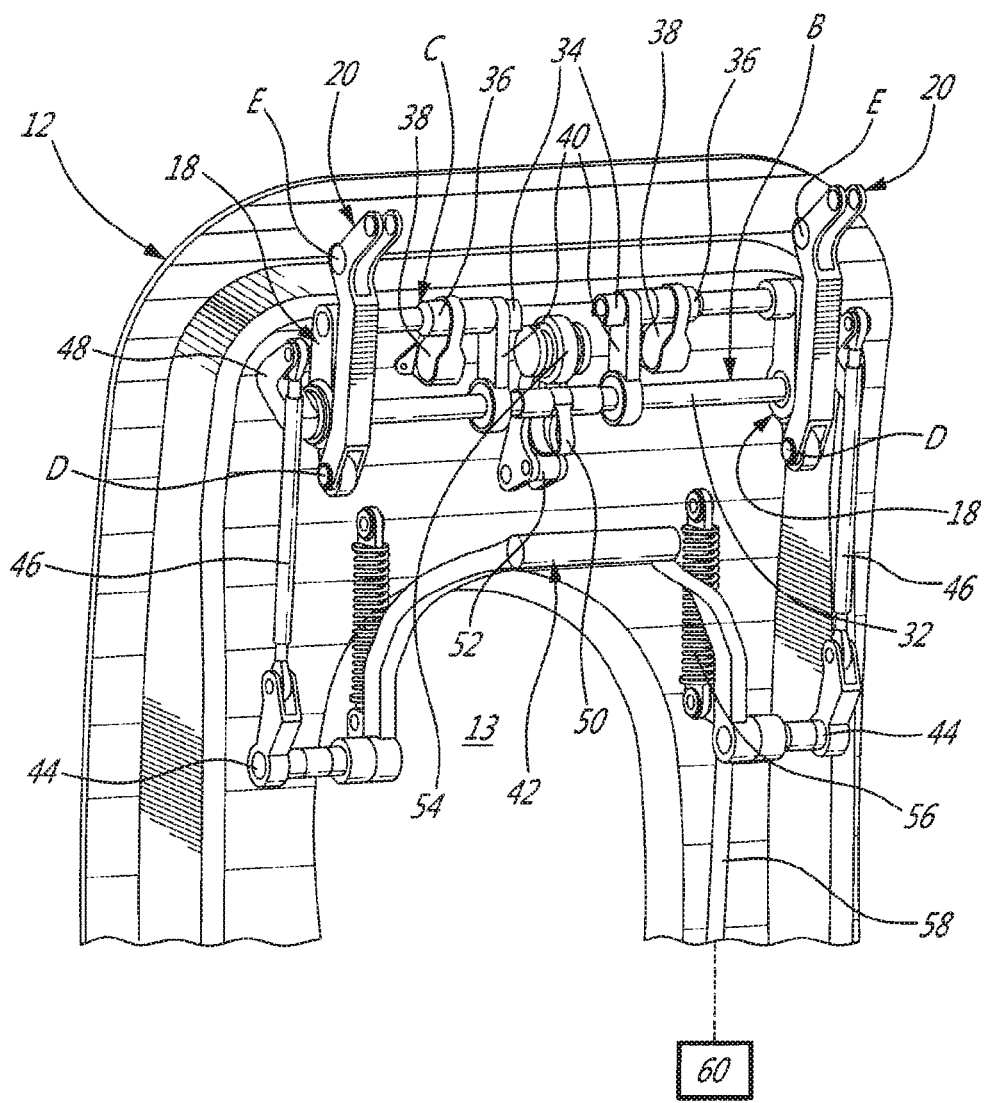
FIG. 4 is a schematic tridimensional view of part of the door of FIG. 2, with a main hinge thereof omitted.

Referring to FIGS. 2-4, the door 12 is shown in its closed position. A connection assembly 14 connects the door 12 to an adjacent portion of the fuselage 2, and generally includes a main hinge 16, and a link assembly including a pair of cross links 18, a pair of trailing links 20 and a pair of door links 22, with one link from each pair similarly extending adjacent to each side of the door window 13 (only one set being visible in FIG. 2).

The main hinge 16 includes a body portion 24 from which a pair of main hinge links 26 extend, one adjacent each side of the window 13. Alternately, a single main hinge link and link assembly may be provided.

Each main hinge link 26 is pivotally connected to the fuselage 2 through a pivot connection A. Each cross link 18 includes a first leg 28 which can be defined as an upper leg when the door 12 is in the closed position and a second leg 30 which can be defined as a lower leg when the door 12 is in the closed position, with the two legs 28, 30 being angled from one another. Each cross link 18 is pivotally connected to the respective main hinge link 26 through a pivot connection B, located at the junction between the two legs 28, 30 of the cross link 18. Referring particularly to FIG. 4, the connection B is defined by a common torque shaft 32 (the purpose of which will be further detailed below) extending between the two cross links 18 and pivotally received in a bore defined through the main hinge links 26 (not visible in FIG. 4).

Each cross link 18 is also pivotally and slidingly connected to the door through a connection C, located at the extremity of the upper leg 28. As can also be seen more clearly in FIG. 4, the connection C is defined by two aligned engagement shafts 34, one extending from the upper leg 28 of each cross link 18 toward the other cross link 18 and parallel to the torque shaft 32. Each engagement shaft 34 has an enlarged engagement member 36 free to pivot and slide within a slot of a guiding member 38 attached to the door 12. Each engagement shaft 34 is connected to the torque shaft 32 by a connection member 40. As depicted in FIG. 2, each cross link 18 defines a first cross link axis BC extending through the connections B, C of the cross link 18 with the main hinge link 26 and the door 12, respectively.

Still referring to FIGS. 2-4, each cross link 18 is also pivotally connected to the respective trailing link 20 through a pivot connection D, located at the extremity of the lower leg 30. The shape of the cross link 18 may alternately be different than the shape shown. As depicted in FIG. 2, each cross link 18 defines a second cross link axis BD extending through the connections B, D of the cross link 18 with the main hinge link 26 and with the trailing link 20, respectively. In the embodiment shown, the two cross link axes BC, BD have different orientations from one another, i.e. the connections B, C, D are not aligned. In a particular embodiment and as an example only, the cross link 18 is sized such that the angle between the cross link axes BC, BD is approximately 33°, and the distance between the connections B and C is approximately 1.4 times the distance between the connections B and D. The angle and ratio may be varied as a matter of design, and in a particular embodiment are contemplated to fall within ±5% of the given values; in a broader aspect within ±10% of the given values; in a still broader embodiment, within ±20% of the given values; in a still broader embodiment, within ±50% of the given values. Other embodiments are also possible.

Each trailing link 20 is pivotally connected to the fuselage through a pivot connection E, and defines a trailing link axis DE extending through the connections D, E of the trailing link 20 with the cross link 18 and with the fuselage 2, respectively. As depicted in FIG. 2, the pivot connection E between the trailing link 20 and the fuselage 2 is located at a greater distance from the outer skin 8 of the fuselage 2 than the pivot connection A between the main hinge link 26 and the fuselage 2. In the embodiment shown, the pivot connection E is also located at a smaller distance from the connection C between the cross link 18 and the door 12 than the pivot connection A.

Each door link 22 has its outer end pivotally connected to the door 12 through a pivot connection F, located closer to the bottom edge of the door 12 than the connection C between the door 12 and each cross link 18. Each door link 22 also has its inner end pivotally connected to bottom of the respective main hinge link 26 through a pivot connection G, and defines a door link axis FG extending through the connections F, G of the door link 22 with the door 12 and with the main hinge link 26, respectively.

The fuselage 2 defines a first reference axis AE extending through the connections A, E of the fuselage 2 with the main hinge link 26 and with the trailing link 20, respectively. A second reference axis CF is defined as extending through the connections C, F of the door 12 with the cross link 18 and with the door link 22, respectively. In a particular embodiment, the sliding engagement of the cross link 18 at connection C defines a largest distance between the connections C and F when the door is in the closed position and a smallest distance when the door is in the opened position; in a particular embodiment, the smallest distance is approximately 7% smaller than the largest distance.

The connection points are arranged on each main hinge link 26 such that the pivot connection B to the respective cross link 18 is located intermediate the pivot connection A with the fuselage 2 and the pivot connection G with the respective door link 22. Each main hinge link 26 thus defines a first main hinge axis BG extending through the pivot connections B, G of the main hinge link 26 with the cross link 18 and with the door link 22, respectively, as well as a second main hinge axis AB extending through the pivot connections A, B of the main hinge link 26 with the fuselage 2 and with the cross link 18, respectively. The two main hinge link axes BG, AB have different orientations from one another, i.e. the connections A, B, G are not aligned. In a particular embodiment and as an example only, the main hinge link 26 is sized such that the angle between the main hinge axes BG, AB is approximately 2.5°, and the distance between the connections B and G is approximately 2.6 times the distance between the connections B and A. The angle and ratio may be varied as a matter of design, and in a particular embodiment are contemplated to fall within ±5% of the given values; in a broader aspect within ±10% of the given values; in a still broader embodiment, within ±20% of the given values; in a still broader embodiment, within ±50% of the given values. Other embodiments are also possible.

In order to minimize the space occupied by the connection assembly 14, links that in prior mechanisms are typically parallel in pairs are by contrast oriented here to be non-parallel. More particularly, with the door in the closed position and referring to FIG. 2, the axes of the pair of links extending from the door, namely the first cross link axis BC and the door link axis FG, are not parallel. Also, the axes of the pair of links extending from the fuselage, namely the trailing link axis ED and the second main hinge axis AB, are not parallel.

In the embodiment shown, still with the door in the closed position, the connection axis of the portion of the cross link 18 interconnecting the pair of members connected to the fuselage, i.e. the second cross link axis BD, extends non-parallel to the first reference axis AE, and the connection axis of the portion of the main hinge link 26 interconnecting the pair of members connected to the door, i.e. the first main hinge axis BG, extends non-parallel to the second reference axis CF.

The table below shows for a particular embodiment and as an example only, the acute angle between each axis and the first reference axis AE and the ratio of the distance between the connection points of each axis and the distance between connections A and E, for the door in the closed position:

| Axis | Approximate angle (°) with respect to AE | Approximate length ratio with respect to AE |
|------|------------------------------------------|--------------------------------------------|
| AB   | −50                                      | 2.8                                        |
| BG   | −54                                      | 7.4                                        |
| ED   | −57                                      | 3.0                                        |
| BD   | −23                                      | 0.9                                        |
| BC   | −56                                      | 1.3                                        |
| FG   | +6                                       | 1.3                                        |
| CF   | −62                                      | 8.1                                        |

As should be appreciated by those skilled in the art, the angles and length ratios above are merely exemplary of one contemplated configuration. The angles and length ratios above may be varied as a matter of design, and in a particular embodiment are contemplated to fall within ±5% of the given values. In a broader aspect, the angles may vary within ±10% of the given values without departing from the scope of the present invention. In a still broader embodiment, the angles vary within ±20% of the given values. In a still broader embodiment, the angles vary within ±50% of the given values. Other embodiments are also possible.

In the embodiment described by the table above, when the door is in the closed position, the angle between the axes of the pair of links extending from the door, namely the first cross link axis BC and the door link axis FG, is thus approximately 62°. In a broader aspect, the angle between the axes of the pair of links extending from the door is from 59° to 65°; more broadly, from 56° to 68°; more broadly, from 50° to 74°; more broadly, from 31° to 93°. In the embodiment described by the table above, the angle between the axes of the pair of links extending from the fuselage, namely the trailing link axis ED and the second main hinge axis AB, is approximately 7°. In a broader aspect, the angle between the axes of the pair of links extending from the fuselage is from 6.7° to 7.4°; more broadly, from 6.3° to 7.7°; more broadly, from 5.6° to 8.4°; more broadly, from 3.5° to 10.5°.

Also, in the embodiment described by the table above, the angle between the second cross link axis BD and the first reference axis AE is approximately 23°. In a broader aspect, the angle between the second cross link axis BD and the first reference axis AE is from 22° to 24°; more broadly, from 21° to 25°; more broadly, from 18° to 28°; more broadly, from 12° to 35°. In the embodiment described by the table above, the angle between the first main hinge axis BG and the second reference axis CF is approximately 8° when the door is in the closed position. In a broader aspect, the angle between the first main hinge axis BG and the second reference axis CF is from 7.6° to 8.4°; more broadly, from 7.2° to 8.8°; more broadly, from 6.4° to 9.6°; more broadly, from 4° to 12°. Of course, alternate orientations are also possible.

The connection assembly defines a virtual pivot point V located outside of the aircraft which moves slightly as the door opens, for example along an arcuate path, due to the sliding engagement of the cross links 18 with the door 12. The non-parallel links help minimize the volume occupied by the connection assembly 14. In a particular embodiment, the volume occupied by the connection assembly 14 may be about half of the volume which would be occupied with a connection assembly having pairs of parallel links sized for the same door. Advantageously, the reduced volume of the connection assembly may help in reducing protrusion of the assembly within the cabin, and may allow containing the connection assembly 14 between the inner and outer skins of the fuselage in smaller aircrafts.

Referring to FIG. 4, the door is actuated by a handle 42 pivotally received through the main hinge links 26 (omitted in FIG. 4 for improved clarity). The handle 42 has opposed extremities 44 extending outwardly from the main hinge links 26, with an upwardly extending member 46 being pivotally connected to each handle extremity 44. Each upwardly extending member 46 is pivotally connected to a lever arm 48 extending at an angle from a respective extremity of the torque shaft 32. Of course, any other adequate type of connection between the handle 42 and the torque shaft 32 may alternately be used.

The torque shaft 32 includes a cam 50 extending around its middle portion. The cam 50 is sandwiched between and in contact with upper and lower latch rollers 52, 54 which are pivotally supported on the door 12. The downward rotation of the handle 42 is transmitted to the torque shaft 32 through the members 46, and rotation of the cam 50 between the rollers 52, 54, more particularly against the upper roller 52, lifts the door 12 from its closed position. Springs 56 connect the handle 42 to the door 12 to maintain proper resistance against activation.

A downwardly extending member 58 is also pivotally connected to one side of the handle 42, and extends downwardly to engage a pressure sensing mechanism 60 which prevents rotation of the handle 42 when a pressure difference between the cabin and the outside environment exceeds a predetermined threshold. In a particular embodiment, the pressure sensing mechanism 60 includes a panel biased by springs to close when the pressure difference is above the threshold, and which in the closed position prevents movement of the handle. The downwardly extending member 58 also connects the handle 42 to an outer handle (not shown) of the door such that the two handles move together.

Referring back to FIG. 2, the door includes two vertically spaced apart rollers 62 on each side (only one of which being shown) each received in a channel defined by a guide member 64 attached to the fuselage 2 and determining the path of the door 12 when the handle is first actuated. The body portion 24 of the main hinge 16 is also pivotally connected at the top to a combined actuator/damper 66, the actuator being primed to open the door 12.

In use, as shown in FIG. 5, upon depression of the handle 42, the engagement of the cam 50 with the upper roller 52 (FIG. 4) causes the door 12 to move initially inward and upward under the action of the actuator. As the door 12 lifts, the position of the main hinge 16 remains the same. The rollers 62 of the door slide within the channel of the respective guide member 64. The door in this intermediate position is completely located inward of a pressure plane P of the closed door, defined by the outline of the fuselage 2.

In FIG. 6, the door 12 is shown in the completely lifted position. The main hinge 16 is still in the same position as when the door 12 was in the closed position. The distance between connection points C and F is minimal. The rollers 62 are now clear of the channel portion of the respective guide member 64 preventing the opening movement of the door 12. The bottom edge of the door is still inward of the fuselage opening, while the top edge of the door has started to move outward. Once the rollers 62 are clear from the constrained path of the guide members 64, the primed actuator pivots the main hinge 16 to pivot the door 12 outwardly to the opened position.

In FIG. 7, the door 12 is shown in the completely opened position. The connection assembly 14 is sized such that movement of the door between the lifted position of FIG. 6 and the opened position of FIG. 7 is done without contact of the door with the outer skin 8 of the fuselage 2. In a particular embodiment, the first main hinge axis BG and second reference axis CF extend substantially parallel (i.e. approximately parallel or parallel) to one another in the opened position, while the other pair of axes that were non-parallel in the closed position remain non-parallel in the opened position. The non-parallel links which help minimize the volume of the connection assembly 14 allow for a relatively small protrusion of the main hinge 16 below the open door, which may help increase the effective open area of the emergency exit 10.

In the embodiment shown, because of the initial inward movement of the door, the door remains in the closed position if not restrained when subjected to internal pressure. The connection assembly is sized such that the door remains attached if opened during flight; the damper connection slows the opening of the door to prevent the door from detaching under the opening force. In a particular embodiment, this allows for the omission of flight locks on the door, thus reducing the number of necessary systems for the door.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A system for opening a door of an aircraft, the system comprising:
   a connection assembly adapted to connect the door to a fuselage section of the aircraft, the connection assembly including:
      a main hinge pivotally connected to the fuselage section; and
      a link assembly connecting the door to the main hinge and pivotally connected to the fuselage section, the link assembly including one member slidingly and pivotally connected to the door; and
   a latch mechanism between the door and the main hinge, the latch mechanism being adapted to be actuated,
   wherein the system is adapted to move the door upwardly and inwardly along a predetermined path without moving the main hinge through movement of the latch mechanism and, subsequently, to pivot the door around a virtual pivot point located outside of the aircraft by moving the main hinge once the door has reached an end of the predetermined path.

2. A system according to claim 1, wherein the connection assembly comprises:
- a pair of first links each having a first connection point pivotally attached to the fuselage section at a respective fuselage location, a second connection point spaced apart from the first connection point and a first link axis extending between the first and second connection points thereof, the first link axes being non-parallel to one another, the fuselage locations being spaced apart and defining a first reference axis extending therebetween;
- a pair of second links each having a first connection point pivotally attached to the door at a respective door location, a second connection point spaced apart from the first connection point and a second link axis extending between the first and second connection points thereof, the second link axes being non-parallel to one another, the door locations being spaced apart and defining a second reference axis extending therebetween;
- one of the first links interconnecting the second connection points of the second links with a first connection axis being defined through the second connection points of the second links and having a different orientation than the first link axis of the one of the first links; and
- one of the second links interconnecting the second connections points of the first links with a second connection axis being defined through the second connection points of the first link and having a different orientation than the second link axis of the one of the second links.

3. The system according to claim 2, wherein the pair of first links and the pair of second links are provided adjacent each one of two sides of the door.

4. The system according to claim 2, wherein the first connection axis is non-parallel to the second reference axis when the door is in the closed position.

5. The system according to claim 2, wherein the first connection axis is approximately parallel or parallel to the second reference axis when the door is in the opened position.

6. The system according to claim 2, wherein the second connection axis is non-parallel to the first reference axis.

7. The system according to claim 2, wherein, with the door in the closed position, the first link axes extend at about 7° from one another and the second link axes extend at about 62° from one another.

8. The system according to claim 2, wherein, with the door in the closed position, the first link axes extend from 6.7° to 7.4° from one another and the second link axes extend from 59° to 65° from one another.

9. The system according to claim 2, wherein, with the door in the closed position, the first link axes extend from 5.6° to 8.4° from one another and the second link axes extend from 50° to 74° from one another.

10. The system according to claim 2, wherein, with the door in the closed position, the first connection axis and the second reference axis extend at about 8° from one another, and the second connection axis and the first reference axis extend at about 23° from one another.

11. The system according to claim 2, wherein, with the door in the closed position, the first connection axis and the second reference axis extend from 7.6° to 8.4° from one another, and the second connection axis and the first reference axis extend from 22° to 24° from one another.

12. The system according to claim 2, wherein, with the door in the closed position, the first connection axis and the second reference axis extend from 6.4° to 9.6° from one another, and the second connection axis and the first reference axis extend from 18° to 28° from one another.

13. The system according to claim 2, wherein the one of the links of the second pair connected to the links of the first pair has the first connection thereof also slidingly connected to the door.

14. A method of opening a door of an aircraft, the door being connected to a fuselage section of the aircraft through a connection assembly including a main hinge pivotally connected to the fuselage section and a link assembly connecting the door to the main hinge and pivotally connected to the fuselage section, the link assembly including one member slidingly and pivotally connected to the door, the method comprising:
- actuating a latch mechanism between the door and the main hinge;
- moving the door upwardly and inwardly along a predetermined path without moving the main hinge through the movement of the latch mechanism; and
- once the door has reached an end of the predetermined path, pivoting the door around a virtual pivot point located outside of the aircraft by moving the main hinge.

* * * * *